(12) United States Patent
Frerking (10) Patent No.: US 7,357,299 B2
(45) Date of Patent: Apr. 15, 2008

(54) METHOD AND APPARATUS FOR SYNCHRONIZATION OF PROXIMATE RFID READERS IN A GAMING ENVIRONMENT

(75) Inventor: Gary Frerking, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

(21) Appl. No.: 10/963,057

(22) Filed: Oct. 12, 2004

(65) Prior Publication Data
US 2006/0076401 A1     Apr. 13, 2006

(51) Int. Cl.
*G06K 17/00*     (2006.01)

(52) U.S. Cl. .................. 235/375; 235/487; 235/383; 340/3.41; 340/10.1

(58) Field of Classification Search ............... 235/375, 235/377, 380, 382, 385, 487; 340/10.1–10.4, 340/572, 3.41
See application file for complete search history.

(56) References Cited

U.S. PATENT DOCUMENTS

| | | | |
|---|---|---|---|
| 5,651,548 A | 7/1997 | French et al. | |
| 5,770,533 A | 6/1998 | Franchi | |
| 5,809,482 A | 9/1998 | Strisower | |
| 5,883,582 A * | 3/1999 | Bowers et al. | 340/10.2 |
| 6,267,671 B1 | 7/2001 | Hogan | |
| 6,446,864 B1 | 9/2002 | Kim et al. | |
| 6,566,997 B1 | 5/2003 | Bradin | |
| 6,727,803 B2 * | 4/2004 | Hulvey | 340/10.31 |
| 6,763,996 B2 * | 7/2004 | Rakers et al. | 235/375 |
| 7,011,309 B2 * | 3/2006 | Soltys et al. | 273/149 R |
| 7,026,935 B2 * | 4/2006 | Diorio et al. | 340/572.2 |
| 7,088,246 B2 * | 8/2006 | Fukuoka | 340/572.5 |
| 7,246,746 B2 * | 7/2007 | McNamara et al. | 235/385 |
| 2002/0063622 A1 * | 5/2002 | Armstrong et al. | 340/10.31 |
| 2002/0147042 A1 * | 10/2002 | Vuong et al. | 463/40 |
| 2002/0159434 A1 * | 10/2002 | Gosior et al. | 370/350 |
| 2003/0036425 A1 * | 2/2003 | Kaminkow et al. | 463/25 |
| 2003/0064798 A1 * | 4/2003 | Grauzer et al. | 463/29 |
| 2003/0130039 A1 | 7/2003 | Nelson | |
| 2003/0148809 A1 | 8/2003 | Nelson | |
| 2003/0176218 A1 | 9/2003 | Lemay et al. | |
| 2005/0030377 A1 * | 2/2005 | Li | 348/143 |
| 2005/0099269 A1 * | 5/2005 | Diorio et al. | 340/10.51 |
| 2005/0116020 A1 * | 6/2005 | Smolucha et al. | 235/375 |
| 2005/0198318 A1 * | 9/2005 | von Mueller et al. | 709/228 |
| 2006/0022801 A1 * | 2/2006 | Husak et al. | 340/10.5 |

(Continued)

*Primary Examiner*—Thien M. Le
*Assistant Examiner*—Edwyn Labaze
(74) *Attorney, Agent, or Firm*—Phil Anderson; McAndrews, Held & Malloy, Ltd.

(57) ABSTRACT

The present invention provides a system and method for an improved player tracking in a gaming environment. Certain embodiments include a plurality of radio frequency identification (RFID) readers for detecting a response signal from an RFID tag, an RFID tag generating a response signal including identification data in response to an interrogation signal transmitted by one of the plurality of RFID readers, and a location manager controlling transmission by the plurality of RFID readers according to at least one collision-avoidance scheme. The collision-avoidance scheme may include one or more of the following schemes: localized RFID reader managers coordinating electrical operation of the plurality of RFID readers, an active RFID reader transmitting the interrogation signal and a plurality of passive RFID readers listening for the response signal, an RFID reader multiplexed through a plurality of antennas, TDMA, CDMA, and/or quasi-random synchronization for the RFID readers, for example.

19 Claims, 6 Drawing Sheets

U.S. PATENT DOCUMENTS

2006/0022824 A1* 2/2006 Olsen et al. ............. 340/572.1
2006/0084502 A1* 4/2006 Downs et al. ................ 463/29
2006/0107061 A1* 5/2006 Holovacs .................... 713/182
2006/0158313 A1* 7/2006 Satou ........................ 340/10.2
2006/0161878 A1* 7/2006 Koh et al. .................. 717/100
2007/0001813 A1* 1/2007 Maguire et al. ........... 340/10.2

* cited by examiner

METHOD AND APPARATUS FOR SYNCHRONIZATION OF PROXIMATE RFID READERS IN A GAMING ENVIRONMENT

BACKGROUND OF THE INVENTION

The present invention generally relates to a gaming environment. In particular, the present invention relates to player tracking in a gaming environment.

Gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments. Additionally, gaming establishments compete among themselves to attract regular and repeat customers.

A gaming machine providing entertaining and enticing features for players would be highly desirable to attract both new and returning players to a gaming establishment. One way to encourage returning players is a player tracking or player loyalty program at a gaming establishment or network of related gaming establishments. Player loyalty programs reward incentives to players based on criteria, such as a number of visits to a casino, a number of games played, or other such criteria. For example, loyalty points may be assigned based on a criterion and redeemed for rewards such as discounts, free food or drink, lodging, transportation, entertainment, or other reward.

Being able to determine a location of certain players in a gaming establishment would also be highly desirable. Player location may be used to provide management of a gaming establishment with information to direct employees to bring a player his or her usual drink, food, and/or loyalty rewards, for example.

Player tracking may be facilitated by a gaming machine and/or by a reader, such as a card reader or a radio frequency identification (RFID) reader at or near the gaming machine. In some systems, for example, a player swipes his or her player card through a reader at a gaming machine before playing a game at that machine. In other systems, for example, an RFID reader detects an RFID tag embedded within a player card.

In an RFID system, the RFID reader includes a microchip and an antenna that transmits electromagnetic waves in an area around the location of the reader. The RFID tag on the player card also includes a microchip and antenna. When the electromagnetic waves from the reader impact the antenna on the tag, a magnetic field is formed. The RFID tag may be passive and draw power from the magnetic field to power the microchip. An active RFID tag is powered by a battery, for example. The microchip at the RFID tag modulates the waves received from the RFID reader and transmits the modulated waves back to the reader. The reader converts the received waves into digital data identifying the tag. The reader may then transmit data to a server to track player loyalty points and/or player location in a gaming establishment.

In gaming establishments utilizing RFID readers or similar systems, interference may result from multiple readers transmitting signals in close proximity to one another. Additionally, interference may result from multiple RFID tags responding to a single reader's transmission. Such interference may prevent scanning of a player's card or proper accumulation of player loyalty points. A malfunction or inaccuracy in the player loyalty or tracking system negatively impacts repeated customer business and positive reputation at a gaming establishment. Thus, accurate tracking of player loyalty points and/or player location is highly desirable.

An RFID-based player tracking system may include a plurality of readers or receivers, such as RFID readers, a plurality of player identification devices, and a server that may track player location and/or loyalty points. RFID readers transmit an "interrogation" signal to activate RFID tags in the vicinity of the reader. After transmission, the RFID readers "listen" or wait to receive response signals from RFID tags in response to the interrogation signal. When an RFID reader receives a response, data conveyed by the response is relayed to the server for further processing. The server may use the data along with information regarding an identity and location of the RFID reader to determine a location of the RFID tag. The RFID tag may be associated with a particular player profile. Once the identity and location of the player are determined, an action such as initiating a player loyalty session or special attraction mode on a nearby gaming machine may be activated by the server. Additionally, attention may be directed to the player at the location by the gaming establishment.

RFID tags may be implemented as read-write devices, capable of receiving and storing information sent by a nearby RFID reader. Thus, the RFID tag may be used to store information amount a player or holder, such as name, refreshment preferences, access level, and other information. Such information stored at the RFID tag may then be accessible by RFID readers. Information transmitted between an RFID reader and an RFID tag may be encrypted.

RFID readers may be integrated into gaming machines or other gaming systems and/or positioned throughout the floor of the gaming establishment (e.g., a casino). In a crowded environment with many RFID readers, RFID readers may interfere with each other through transmission and/or receipt of signals. Interference, often referred to as reader collision, may occur when two or more RFID readers within range of each other transmit interrogation signals at approximately the same time. Simultaneous transmission may result in erratic reading of RFID tags, reduced reading range, or even an inability to read tags.

Distance between RFID readers that exposes the readers to reader collision varies (from less than a foot to hundreds of feet, for example) depending on factors such as transmitter power, receiver sensitivity, RFID reader frequency, and physical characteristics of transceiver antenna and RFID tags in the area. Environmental factors, such as metal structures that may conduct or reflect radio signals, may also influence a potential for mutual interference.

Systems, such as U.S. Patent Publication No. 2003/0036425A1 to Kaminkow et al, attempt to address reader collision in two primary ways: (1) by shaping an active volume of the RFID reader through use of shielding around RFID reader antenna and/or by varying transmitter power and (2) by using the location manager to control operation of the RFID readers. However, both methods have drawbacks.

Shaping the active volume of an RFID reader by shielding the RFID reader antenna may be somewhat effective in reducing the interference between the RFID readers housed in adjacent gaming systems. However, shielding does not reduce interference between RFID readers housed in gaming machines that face each other from opposing banks of machines. Reducing the power of the transmitters may help reduce interference to a limited extent but also reduces an ability of an interrogation signal to penetrate to an RFID tag held in a wallet, purse or pocket, for example. Reducing power of transmitters to a point that eliminates reader collision may also create blind spots in a system's coverage of a gaming environment, such as a casino floor.

Additionally, the shielding material used to shape the active volume of the RFID reader may also have an undesirable effect of de-tuning the RFID antenna. De-tuning the antenna results in reduced performance of the RFID reader.

Current RFID readers operate autonomously with respect to each other and communicate only with a single, centralized location manager responsible for managing the operation of all RFID readers on a property. Such a system may be managing the operation of hundreds or even thousands of RFID readers, as well as processing data produced by the readers. Extensive management places a heavy burden on current tracking systems. Additionally, a complex network associated with current systems includes inherent delays that reduce responsiveness of the system and impair the ability of the system to process a large number of RFID tags in a timely manner.

Attempts have been made to overcome the difficulty in reading multiple RFID tags in a given area. In one method, a command response protocol is used to interrogate RFID tags with specific identities or groups of identities using a tree algorithm. However, this and other methods are susceptible to blocking efforts, such as denial of service attacks by specially built RFID tags, such as those developed by RSA Laboratories, that respond to all interrogations regardless of the identifier.

Therefore, a system and method that overcome the shortcomings associated with current systems would be highly desirable. A system and method that improve management of RFID devices in a gaming environment would be highly desirable. A system and method that help to avoid deliberate interference, such as denial of service devices, would also be highly desirable.

Thus, there is a need for an improved system and method for synchronizing RFID readers in close proximity in a gaming environment.

BRIEF SUMMARY OF THE INVENTION

The present invention provides a system and method for improved player tracking in a gaming environment. An embodiment of an improved player tracking system includes a plurality of radio frequency identification (RFID) readers for detecting a response signal from an RFID tag, an RFID tag generating a response signal including identification data in response to an interrogation signal transmitted by one of the plurality of RFID readers, and a location manager controlling transmission by the plurality of RFID readers according to at least one collision-avoidance scheme. The collision-avoidance scheme may include one or more of the following schemes: localized RFID reader managers coordinating electrical operation of the plurality of RFID readers, an active RFID reader transmitting the interrogation signal and a plurality of passive RFID readers listening for the response signal, and an RFID reader multiplexed through a plurality of antennas. The collision-avoidance scheme also may include a time division multiple access (TDMA) synchronization scheme for the plurality of RFID readers, a carrier detect multiple access (CDMA) synchronization scheme for the plurality of RFID readers, and/or a quasi-random synchronization scheme for the plurality of RFID readers. In an embodiment, the collision-avoidance scheme includes active synchronization of RFID readers via at least one of a wire-based protocol and a wireless network protocol.

In an embodiment, the plurality of RFID readers are positioned with respect to a plurality of gaming machines. The location manager may track a location of the RFID tag based on information received from at least one of the plurality of RFID readers. The location manager may communicate with a plurality of localized RFID reader managers to control the plurality of RFID readers. In an embodiment, the RFID tag is incorporated into a card, badge, or other item such as a bracelet or ring.

An embodiment of a method for synchronizing radio frequency identification readers located in close proximity in a gaming environment includes coordinating a plurality of RFID readers according to a synchronization scheme, transmitting an interrogation signal according to the synchronization scheme, and receiving a response signal generated in response to the interrogation signal. The response signal includes identification information for an RFID tag. The synchronization scheme includes at least one of the following: coordinating electrical operation of the plurality of RFID readers using localized RFID reader managers, transmitting the interrogation signal from an active RFID reader and waiting for the response signal at a plurality of passive RFID readers, multiplexing an RFID reader with a plurality of antennas, using TDMA to transmit the interrogation signal from one of the plurality of RFID readers, using CDMA to transmit the interrogation signal from one of the plurality of RFID readers, and using a quasi-random synchronization scheme to transmit the interrogation signal from one of the plurality of RFID readers. The synchronization scheme may also include active synchronization of the plurality of RFID readers via at least one of a wire-based protocol and a wireless network protocol.

In an embodiment, the plurality of RFID readers are positioned with respect to a plurality of gaming machines. A location of the RFID tag may be tracked based on the identification information received from at least one of the plurality of RFID readers. In an embodiment, a central location manager controls the plurality of RFID readers.

An embodiment of a method for improved tracking in a gaming environment includes positioning a plurality of RFID readers in a gaming environment, coordinating the plurality of RFID readers according to a collision-avoidance scheme, transmitting an interrogation signal according to the collision-avoidance scheme, receiving a response signal generated in response to the interrogation signal, and tracking the RFID tag in the gaming environment based on the identification information. The response signal includes identification information for an RFID tag. The collision-avoidance scheme includes at least one of coordinating electrical operation of the plurality of RFID readers using localized RFID reader managers, transmitting the interrogation signal from an active RFID reader and waiting for the response signal at a plurality of passive RFID readers, multiplexing an RFID reader with a plurality of antennas, using TDMA to transmit the interrogation signal, using CDMA to transmit the interrogation signal, and using a quasi-random synchronization scheme to transmit the interrogation signal. The collision-avoidance scheme may also include active synchronization of the plurality of RFID readers via at least one of a wire-based protocol and a wireless network protocol.

In an embodiment, the method further includes positioning the plurality of RFID readers with respect to a plurality of gaming machines. The method may also include tracking a location of the RFID tag based on the identification information received from at least one of the plurality of RFID readers. Additionally, the method may include associating the identification information with a record. In an embodiment, location and activity of a person, such as a player or employee, may be tracked using information from the RFID tag and at least one of the plurality of RFID readers.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Figure 1:
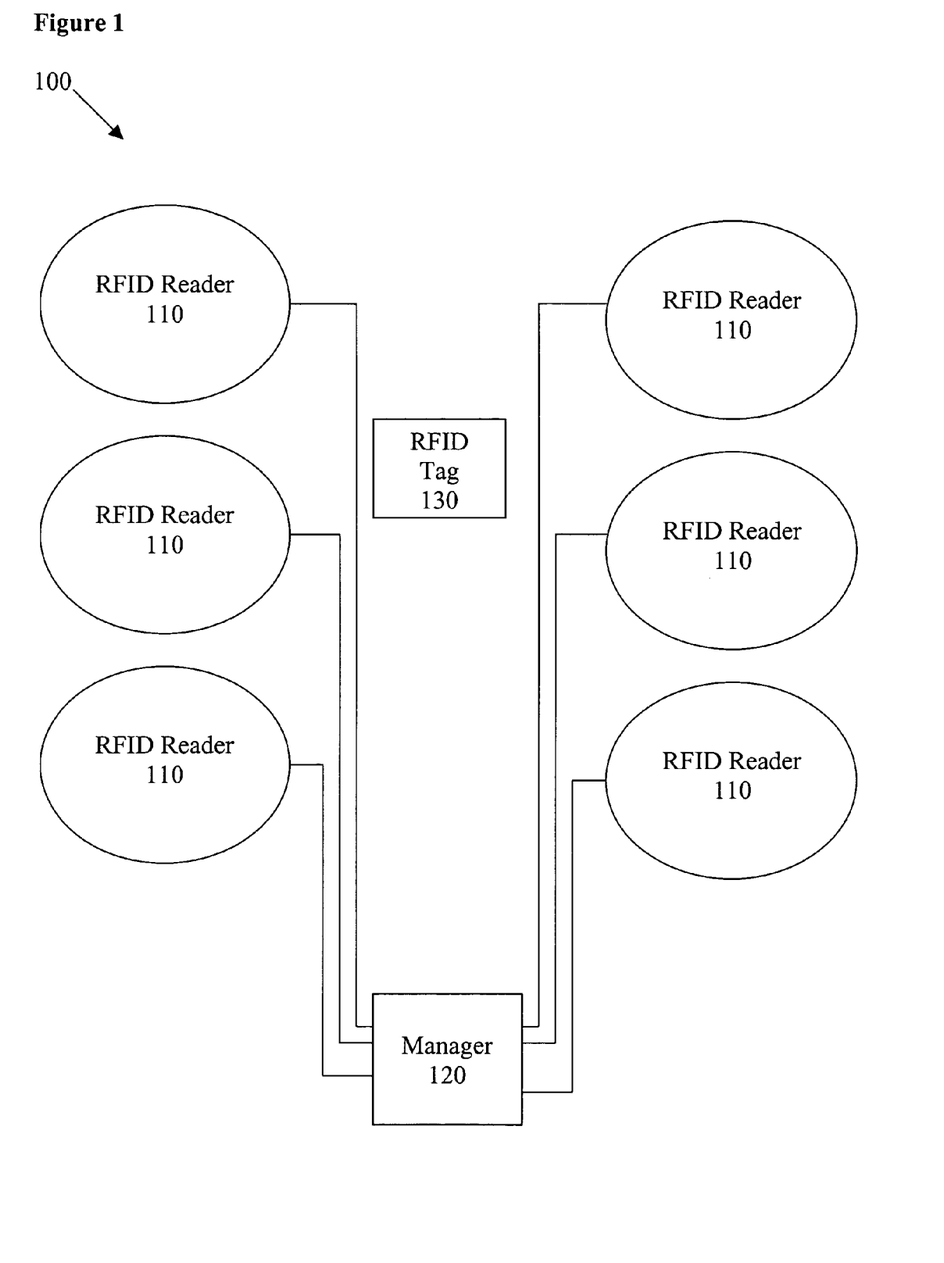
FIG. 1 illustrates a player tracking system used in accordance with an embodiment of the present invention.

FIG. 1 illustrates a player tracking system 100 used in accordance with an embodiment of the present invention. The system 100 includes a plurality of Radio Frequency Identification (RFID) readers 110, a manager 120, and at least one RFID tag 130. The readers 110 communicate with the manager 120 via a wireless and/or wired connection.

In an embodiment, the RFID readers 110 include an antenna and a microchip or processor. In an embodiment, the manager 120 includes a server, a workstation, a handheld device, and/or other computing system. In an embodiment, the RFID tag 130 includes an antenna and a microchip or other processor. The RFID tag 130 may be incorporated into a badge, card, or accessory, such as bracelet or ring, for example.

In operation, the readers 110 transmit an interrogation signal to detect the tag 130. The interrogation signal may be a radio frequency signal, an electromagnetic signal, a microwave signal, an infrared signal, or other communication signal, for example. If the tag 130 detects an interrogation signal, either passively or actively, the tag 130 generates a response identification signal that is transmitted back to the reader 110. The reader 110 relays the information in the identification signal to the manager 120. Thus, player identity, player location relative to a reader 110, and other information may be determined and relayed to the manager 120, for example.

In an embodiment, the reader 110 may be incorporated into a gaming machine or other gaming system or may be located separately from a gaming machine or gaming system. For example, the reader 110 may be part of a gaming machine console or positioned on or adjacent to a gaming machine or gaming system. As another example, the reader 110 may be integrated into a button, handle, or other components of a gaming machine, for example. In an embodiment, the RFID reader 110 may be a handheld device.

In an embodiment, the RFID tag 130 includes an integrated circuit (for example, a Microchip MCRF250 or other chip). The RFID readers 110 interrogate by sending a "gap pulse." The RFID tag 130 uses a random number generator, such as an internal random number generator, to determine a time delay. After the time delay has passed, the RFID tag 130 transmits a reply to the RFID reader 110. Thus, RFID tags transmit responses at different times without a specialized tag collision avoidance algorithm in the RFID reader 110. Random response times also help avoid denial of service and other attack techniques.

Figure 2:
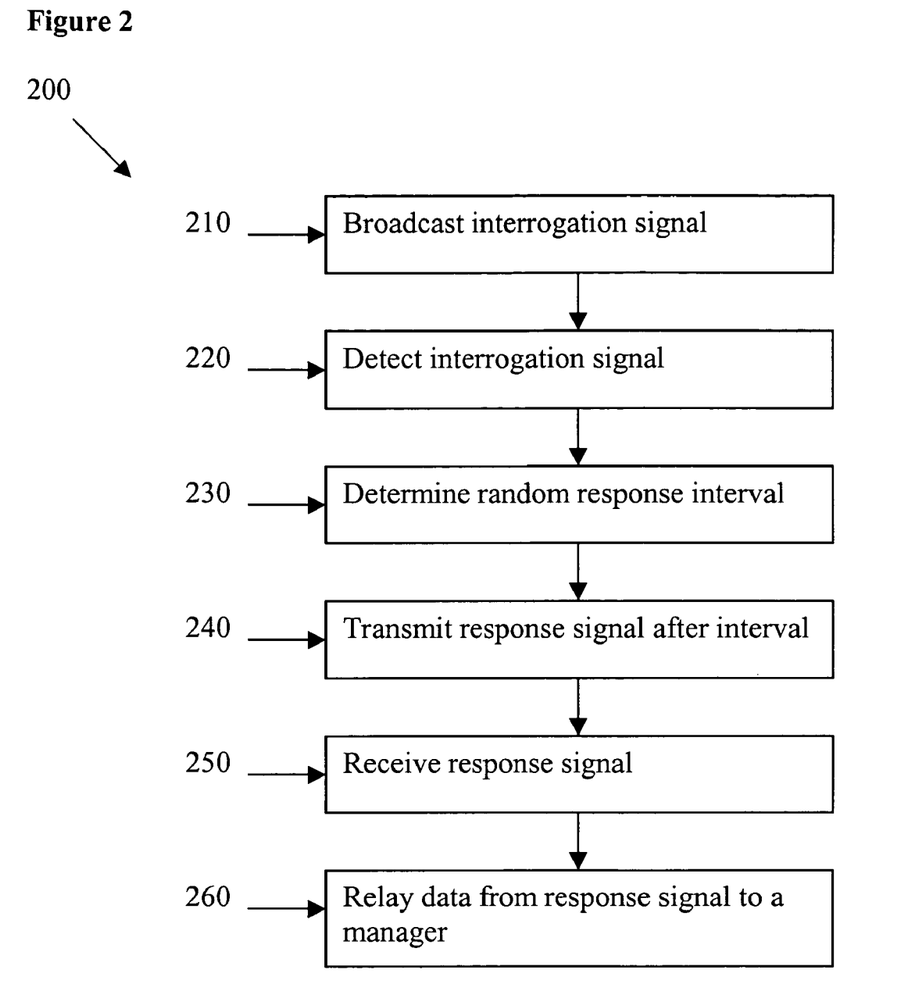
FIG. 2 illustrates a flow diagram for a method for radio frequency identification at random intervals in a gaming environment in accordance with an embodiment of the present invention.

FIG. 2 illustrates a flow diagram for a method 200 for radio frequency identification at random intervals in a gaming environment in accordance with an embodiment of the present invention. First, at step 210, an interrogation signal is broadcast to identify nearby RFID tags. Then, at step 220, the interrogation signal is detected. For example, an RFID tag 130 detects the interrogation signal from an RFID reader 110.

Next, at step 230, a random response interval is determined. For example, a random number generator at the RFID tag 130 generates a random number to determine a time delay before response by the RFID tag 130. Then, at step 240, a response signal is transmitted after the random response interval has passed. For example, after the random time delay, the RFID tag 130 produces a response signal including identification information and transmits the response signal back to the RFID reader 110.

At step 250, the response signal is received. For example, the RFID reader 110 antenna receives the response signal from the RFID tag 130. Finally, at step 260, data from the response signal is relayed to a manager 120. For example, the reader 110 transmits player identification and location information to the manager 120 to facilitate player tracking.

Certain embodiments of the present invention provide solutions to minimize reader collision caused by multiple RFID readers with overlapping active volumes. One or more techniques, as described further below, may be used in the system 100 to minimize reader collision and effects of reader collision.

Figure 3:
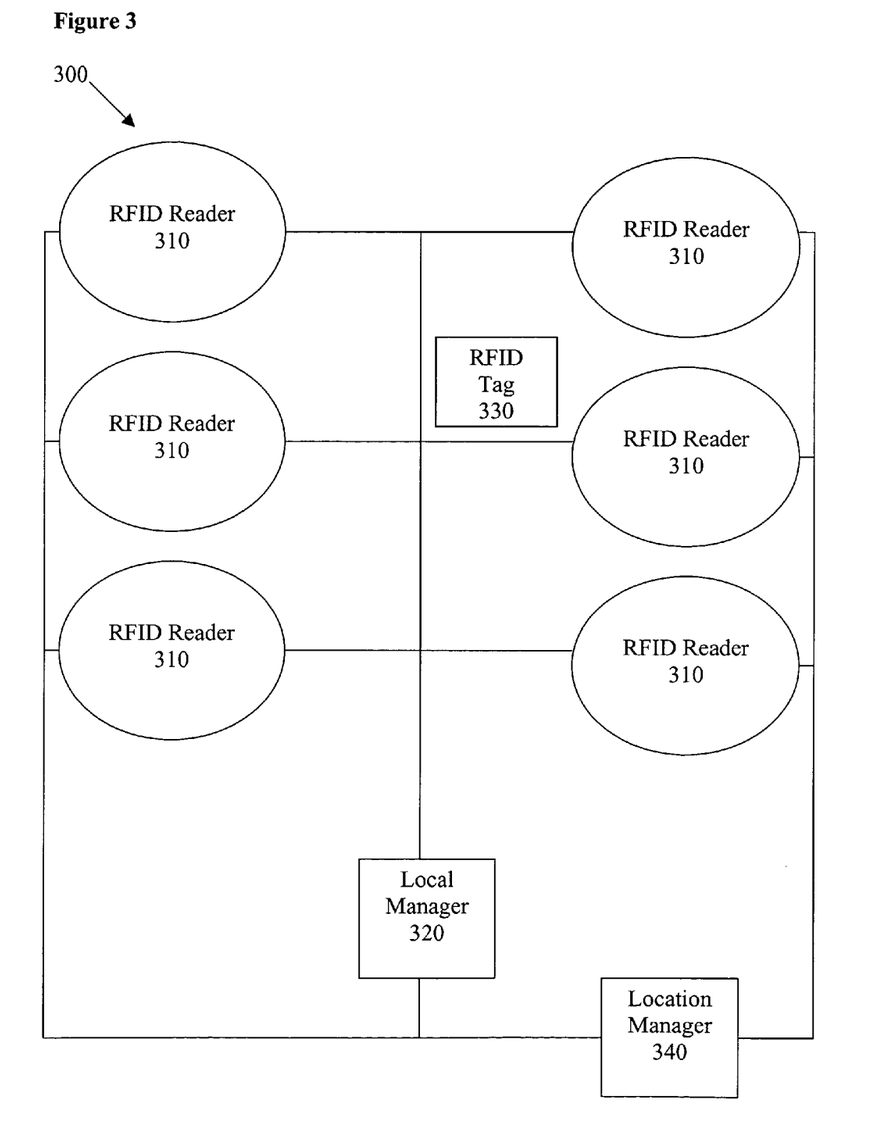
FIG. 3 illustrates a player tracking system including localized managers used in accordance with an embodiment of the present invention.

FIG. 3 illustrates a player tracking system 300 including localized managers used in accordance with an embodiment of the present invention. The player tracking system 300 includes a plurality of RFID readers 310, a local manager 320, an RFID tag 330, and a location manager 340.

The plurality of RFID readers 310 are connected to the local manager 320 through a wired or wireless network. The local manager 320 controls synchronization and operation of the RFID readers 310. The RFID readers 310 are also connected to the location manager 340 through a network, which may or may not be the same network as the network connecting RFID readers 310 to the local manager 320.

The RFID readers 310 send interrogation signals. The RFID tag 330 receives an interrogation signal and sends a response signal. The RFID reader(s) 310 receiving the response signal send data conveyed in the response signal to the location manager 340.

In the system 300, rather than using a single server to manage electrical operation as well as collection and processing of data from the RFID readers 310, electrical operation of the RFID readers 310 is controlled by one or more localized managers 320. In an embodiment, the localized managers 320 do not collect or process data from the RFID readers 310. The local manager 320 focuses on coordinating the electrical operation of the RFID readers 310 under the control of the local manager 320.

In an embodiment, localized RFID reader managers 320 are connected to and may communicate with other local managers 320. Thus, local managers 320 may coordinate operations of adjacent groups of RFID readers 310, for example. In an embodiment, localized RFID reader managers 320 are also connected to and may communicate with the centralized location server 340. The location manager 340 may serve as a central authority for RFID operations and configurations. The location manager 340 may collect player and location data from the RFID readers 310 and process the data for player tracking and other purposes, for example. In an embodiment, the tracking system 300 may also be used to track employees of a gaming establishment.

Figure 4:
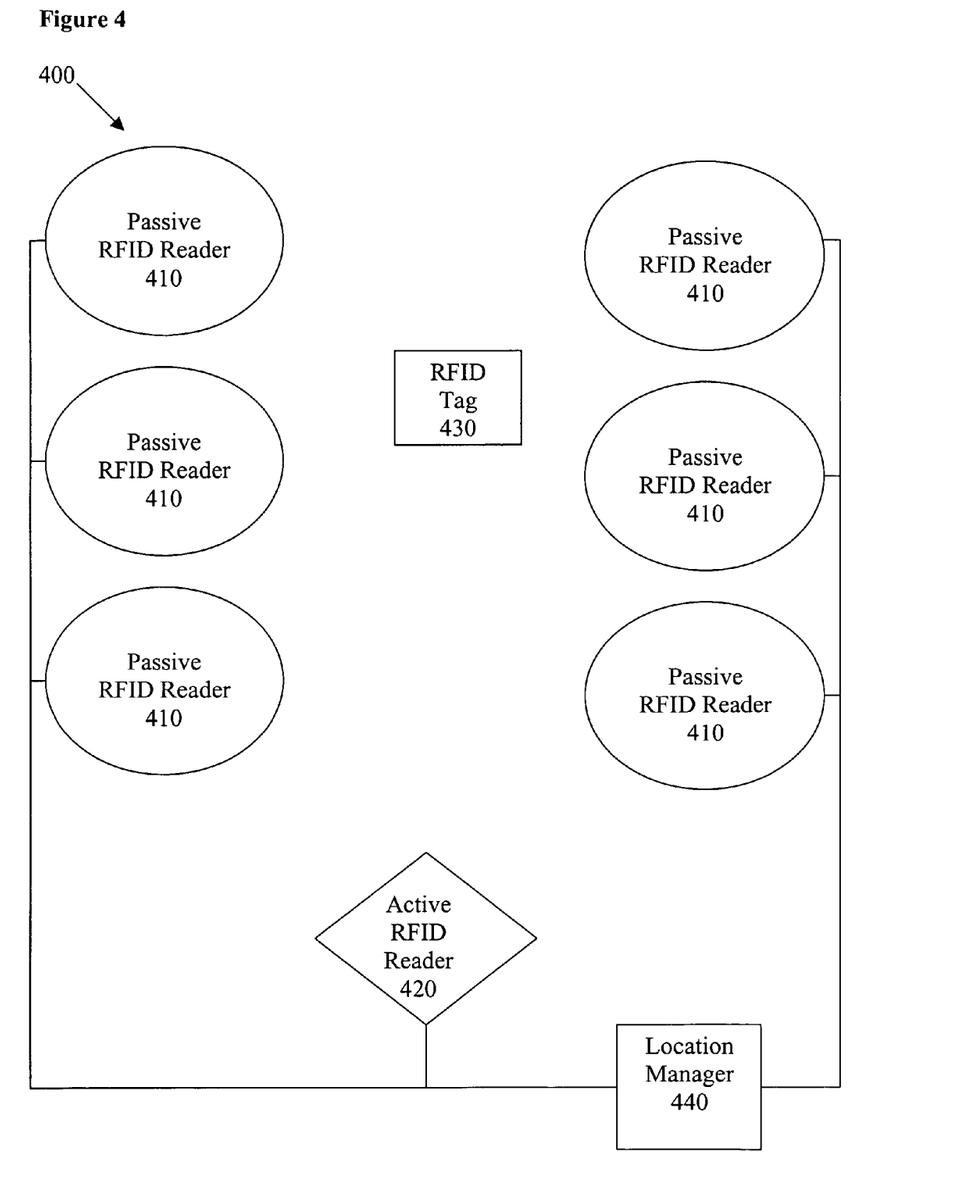
FIG. 4 illustrates a player tracking system utilizing an active RFID reader with multiple passive RFID readers used in accordance with an embodiment of the present invention.

FIG. 4 illustrates a player tracking system 400 utilizing an active RFID reader with multiple passive RFID readers used in accordance with an embodiment of the present invention. The system 400 includes a plurality of passive RFID readers 410, an active RFID reader 420, an RFID tag 430, and a location manager 440.

The plurality of passive RFID readers 410 are connected to the location manager 440 through a wired or wireless network. The active RFID reader 420 is also connected to the location manager 440.

The active RFID reader 420 transmits an interrogation signal. The RFID tag 430 receives the interrogation signal. The RFID tag 430 then sends a response signal that is received by RFID readers within receiving range, including both passive RFID readers 410 and active RFID reader 420. All RFID readers 410, 420 receiving the response signal from the RFID tag 430 convey the received data to the location manager 440.

In a dense RFID reader environment, such as a bank of electronic gaming machines, use of a single active RFID reader 420 with multiple passive RFID readers 410 may be beneficial as well as cost effective. In an embodiment, each gaming machine is outfitted with a passive RFID reader 410 that is capable of receiving response signals from a RFID tag 430. The active RFID reader 420 is capable of sending interrogation signals and receiving response signals. An active RFID reader 420 is positioned such that an active volume of the active RFID reader 420 covers a group of passive RFID readers 410. In an embodiment, the active RFID readers 420 in a gaming environment are positioned so that all of the passive RFID readers 410 in the gaming environment are covered by an active RFID reader. When the active RFID reader 420 transmits an interrogation signal, all RFID readers 410, 420 in the area may receive the responses from RFID tags 430 in the vicinity. The active RFID readers 420 may also employ additional techniques to avoid reader collision with other nearby active RFID readers.

Figure 5:
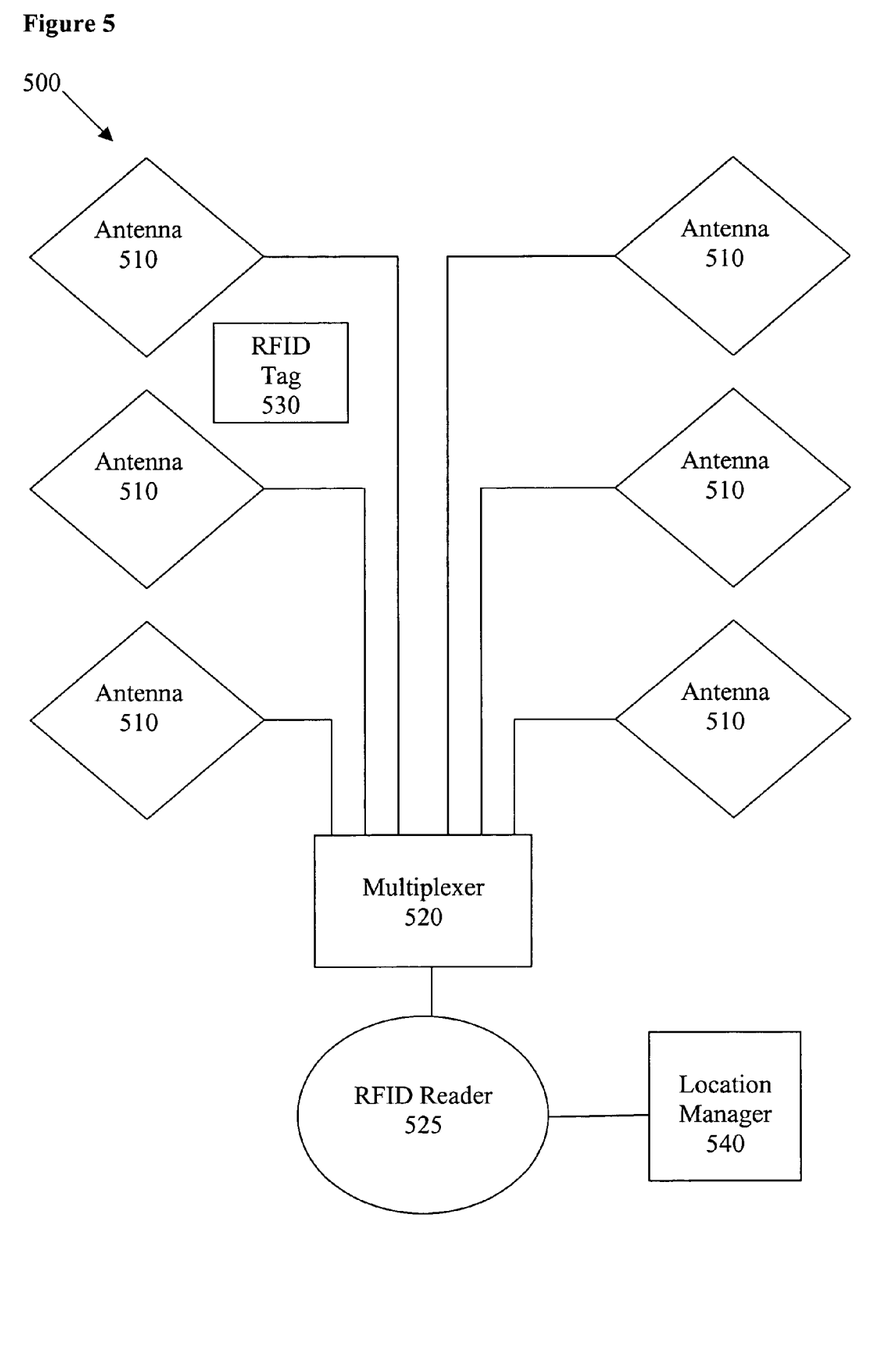
FIG. 5 illustrates a player tracking system that multiplexes a single RFID reader through multiple antennas in accordance with an embodiment of the present invention.

FIG. 5 illustrates a player tracking system 500 that multiplexes a single RFID reader through multiple antennas in accordance with an embodiment of the present invention. The system 500 includes a plurality of antennas 510, a multiplexer 520, an RFID reader 525, an RFID tag 530, and a location manager 540.

The RFID reader 525 is connected to a plurality of antennas 510 through the multiplexer 520. The multiplexer 520 switches between antennas 510. In an embodiment, the multiplexer 520 switches between antennas 510 on a rotating basis, for example. When a response signal from RFID tag 530 is received, data conveyed by the signal, as well as information related to the antenna 510 that is active at the time of reception, is sent to the location manager 540.

In an embodiment, a single RFID reader 525 may be multiplexed through a plurality of antennas 510 positioned at different locations. For example, an antenna 510 may be placed in several electronic gaming machines. The multiplexing circuitry 520 allows one antenna 510 to transmit at any given time.

In an embodiment, the multiplexer 520 and/or location manager 540 poll the antennas 510. An antenna 510 may execute a complete transmit and receive cycle before the multiplexer 520 switches to another antenna 510.

In another embodiment, time division multiple access (TDMA) may be used to reduce reader collision. RFID readers in a given area are synchronized to a common time base. For example, a local or location manager or other computer transmits a timing signal to synchronize the RFID readers. The RFID readers are programmed to operate at different offsets from a base time unit (each half second, for example). That is, a manager or other computer system assigns different time slots to readers. A reader transmits in a given time slot and receives response signals at any time slot. Use of different offsets helps to ensure that the readers do not transmit at the same time.

In another embodiment, carrier detect multiple access (CDMA) or carrier sense multiple access (CSMA) may be used to reduce reader collision. Prior to transmitting an interrogation signal, an RFID reader checks for a presence of a carrier indicating another nearby RFID reader is transmitting an interrogation signal. If a carrier is detected, the RFID reader delays for a period of time, such as a fixed or random period of time. After the period of time has elapsed, the reader again checks for the presence of a carrier. When a carrier is no longer detected, the RFID reader sends an interrogation signal.

In an embodiment, RFID readers may be synchronized via wire- or wireless-based modes. For example, RFID readers communicate with each other and coordinate operations through a wire-based protocol, such as RS-485. As another example, RFID readers communicate with each other and coordinate operations through a wireless network or other wireless communications mode (for example, infrared). Readers synchronize with each other as they operate. A scheme or protocol, such as a wired, wireless (e.g., 802.11), or infrared scheme, may be used to synchronize reader transmission. Furthermore, RFID readers may operate in a quasi-random fashion, such as that described in U.S. Pat. No. 6,566,997, which is herein incorporated by reference.

A manager or computer receives data from RFID readers in accordance to one or more of the above-described embodiments. The data includes an RFID tag identification number, RFID reader identification number, direction, distance, and/or timing information, for example. The data may be used to identify a patron from a database. The data may be used to determine the patron or employee's location in a gaming establishment. For a more accurate position, location data may be triangulated from multiple RFID readers.

Figure 6:
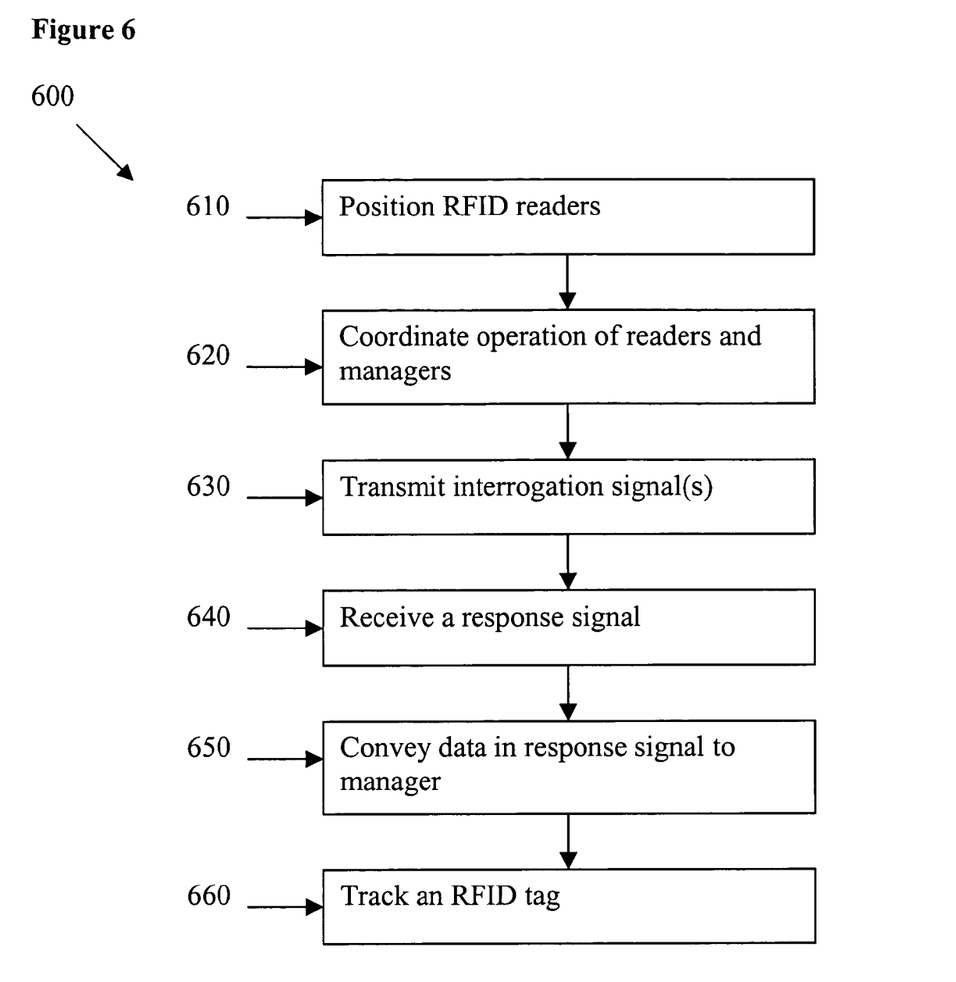
FIG. 6 shows a flow diagram for a method for improved player tracking in accordance with an embodiment of the present invention.

FIG. 6 shows a flow diagram for a method 600 for improved player tracking in accordance with an embodiment of the present invention. First, at step 610, RFID readers are positioned in a gaming establishment. For example, RFID readers may be positioned on or incorporated in electronic gaming machines in a casino. Next, at step 620, operation of the readers and one or more manager systems is coordinated using one or more of the communication techniques described above. For example, localized RFID reader managers and a central location manager may be used with RFID readers operating using a TDMA transmission scheme to detect RFID tags in a casino. Then, at step 630, one or more interrogation signals are transmitted by one or more RFID readers. For example, the RFID readers at the gaming machines transmit interrogation signals according to their time slots to detect RFID tags.

At step 640, a response signal is received from an RFID tag. For example, at least one RFID reader in a vicinity to the RFID tag receives the response signal generated by the RFID tag in response to the interrogation signal(s). Next, at step 650, data conveyed in the response signal is relayed to a local or central manager system. The RFID reader(s) extract data from the response signal and relay the data to the central location manager. Then, at step 660, the RFID tag (and the player or employee associated with the tag) is tracked by the manager system or central authority. For example, the data from the RFID tag and RFID reader(s) may be used to determine a location of the RFID tag (e.g., through triangulation from multiple readers or location information for a single reader) and/or monitor activities of a bearer of the RFID tag.

Thus, certain embodiments provide one or more methods for RFID reader management and reduction in reader collision. Reduction in reader collision and other interference provides improved player tracking, player loyalty programs, employee tracking, and casino management. Various embodiments may be used alone or in various combinations.

Improved player tracking allows attention to be paid to recurring customers, as well as new customers. Improved player tracking allows traffic patterns to be analyzed in a gaming environment to identify active and idle areas. Improved player tracking allows a gaming system or operator to trigger a gaming machine or bank of gaming machines to activate a certain attract mode, indicator, and/or gaming mode, for example, based on the player located nearby. Improved employee tracking helps preserve security and responsibility in a gaming environment.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. An improved player tracking system for a gaming environment, said system comprising:
a plurality of radio frequency identification (RFID) readers positioned with respect to gaming machines in the gaming environment for detecting a response signal from an RFID tag;
an RFID tag generating a response signal including identification data in response to an interrogation signal transmitted by one of said plurality of RFID readers, said RFID tag and identification data identifying a player; and
a location manager controlling transmission by said plurality of RFID readers according to at least one reader collision-avoidance scheme.

2. The system of claim 1, wherein said at least one collision-avoidance scheme further includes at least one of:
localized RFID reader managers coordinating electrical operation of said plurality of RFID readers;
an active RFID reader transmitting said interrogation signal and a plurality of passive RFID readers listening for said response signal;
an RFID reader multiplexed through a plurality of antennas;
a time division multiple access (TDMA) synchronization scheme for said plurality of RFID readers;
a carrier detect multiple access (CDMA) synchronization scheme for said plurality of RFID readers; and
a quasi-random synchronization scheme for said plurality of RFID readers.

3. The system of claim 1, wherein said at least one collision-avoidance scheme further includes active synchronization of RFID readers via at least one of a wire-based protocol and a wireless network protocol.

4. The system of claim 1, wherein said plurality of RFID readers are positioned with respect to a plurality of gaming machines.

5. The system of claim 1, wherein said location manager tracks location of said RFID tag based on information received from at least one of said plurality of RFID readers.

6. The system of claim 1, wherein said location manager communicates with a plurality of localized RFID reader managers to control said plurality of RFID readers.

7. The system of claim 1, further comprising a card, badge, or accessory which includes said RFID tag.

8. A method for synchronizing radio frequency identification readers for player tracking located in close proximity in a gaming environment, said method comprising:
coordinating a plurality of radio frequency identification (RFID) readers according to a reader synchronization scheme;
transmitting an interrogation signal according to said synchronization scheme; and
receiving a response signal generated in response to said interrogation signal, said response signal including identification information for an RFID tag,
wherein said reader synchronization scheme includes at least one of:
coordinating electrical operation of said plurality of RFID readers using localized RFID reader managers;
transmitting said interrogation signal from an active RFID reader and waiting for said response signal at a plurality of passive RFID readers;
multiplexing an RFID reader with a plurality of antennas;
using time division multiple access (TDMA) to transmit said interrogation signal from one of said plurality of RFID readers;
using carrier detect multiple access (CDMA) to transmit said interrogation signal from one of said plurality of RFID readers; and
using a quasi-random synchronization scheme to transmit said interrogation signal from one of said plurality of RFID readers.

9. The method of claim 8, wherein said synchronization scheme further includes active synchronization of said plurality of RFID readers via at least one of a wire-based protocol and a wireless network protocol.

10. The method of claim 8, further comprising positioning said plurality of RFID readers with respect to a plurality of gaming machines.

11. The method of claim 8, further comprising tracking a location of said RFID tag based on said identification information received from at least one of said plurality of RFID readers.

12. The method of claim 8, further comprising controlling said plurality of RFID readers using a central location manager.

13. A method for improved tracking in a gaming environment, said method comprising:
   positioning a plurality of radio frequency identification (RFID) readers in a gaming environment;
   coordinating said plurality of RFID readers according to a reader collision-avoidance scheme;
   transmitting an interrogation signal according to said reader collision-avoidance scheme;
   receiving a response signal generated in response to said interrogation signal, said response signal including identification information for an RFID tag, said RFID tag identifying a player; and
   tracking said RFID tag in said gaming environment based on said identification information.

14. The method of claim 13, wherein said collision-avoidance scheme comprises at least one of:
   coordinating electrical operation of said plurality of RFID readers using localized RFID reader managers;
   transmitting said interrogation signal from an active RFID reader and waiting for said response signal at a plurality of passive RFID readers;
   multiplexing an RFID reader with a plurality of antennas;
   using time division multiple access (TDMA) to transmit said interrogation signal;
   using carrier detect multiple access (CDMA) to transmit said interrogation signal; and
   using a quasi-random synchronization scheme to transmit said interrogation signal.

15. The method of claim 13, wherein said collision-avoidance scheme further includes active synchronization of said plurality of RFID readers via at least one of a wire-based protocol and a wireless network protocol.

16. The method of claim 13, further comprising positioning said plurality of RFID readers with respect to a plurality of gaming machines.

17. The method of claim 13, further comprising tracking a location of said RFID tag based on said identification information received from at least one of said plurality of RFID readers.

18. The method of claim 13, further comprising associating said identification information with a record.

19. The method of claim 13, further comprising tracking location and activity of a person using information from said RFID tag and at least one of said plurality of RFID readers.

* * * * *